United States Patent
Quade et al.

(10) Patent No.: US 6,237,936 B1
(45) Date of Patent: May 29, 2001

(54) VEHICLE INFLATABLE RESTRAINT SYSTEM

(75) Inventors: Marshall Lawrence Quade, Pinckney; David Webster Clark, Troy; Joseph Robert Brown, Grosse Ile, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/222,164

(22) Filed: Dec. 29, 1998

(51) Int. Cl.[7] .................................................. B60R 21/22
(52) U.S. Cl. .................................... 280/730.2; 280/728.2; 280/728.3
(58) Field of Search ............................. 280/730.2, 728.2, 280/728.3

(56) References Cited

U.S. PATENT DOCUMENTS

| | | | |
|---|---|---|---|
| 5,031,930 | 7/1991 | Sato | 280/732 |
| 5,160,164 * | 11/1992 | Fischer et al. | 280/743 |
| 5,306,042 * | 4/1994 | Frank | 280/728 |
| 5,340,149 * | 8/1994 | Gajewski | 280/732 |
| 5,348,339 * | 9/1994 | Turner | 280/728 |
| 5,364,124 | 11/1994 | Donegan et al. . | |
| 5,398,959 | 3/1995 | Avila | 280/728 B |
| 5,405,166 | 4/1995 | Rogerson | 280/739 |
| 5,458,365 * | 10/1995 | Rogers et al. | 280/728.3 |
| 5,505,487 | 4/1996 | Brown et al. . | |
| 5,607,179 * | 3/1997 | Lenart et al. | 280/728.2 |
| 5,628,527 | 5/1997 | Olson et al. . | |
| 5,653,461 | 8/1997 | Fischer | 280/743.1 |
| 5,676,394 | 10/1997 | Maly | 280/728.3 |
| 5,709,402 * | 1/1998 | Leonard | 280/728.2 |
| 5,730,463 | 3/1998 | Fisher et al. | 280/728.3 |
| 5,762,363 * | 6/1998 | Brown et al. | 280/730.2 |
| 5,794,968 * | 9/1998 | Yamamoto et al. | 280/728.2 |

* cited by examiner

*Primary Examiner*—J. J. Swann
*Assistant Examiner*—J. Allen Shriver
(74) *Attorney, Agent, or Firm*—David B. Kelley

(57) ABSTRACT

An inflatable restraint system for attachment to an occupant seat of an automotive vehicle has a canister with an inflatable restraint deployable therefrom, a chute member slidably engaged with the canister for directing deployment of the inflatable restraint and movable between a stowed position when the inflatable restraint is uninflated and the deployed position when the inflatable restraint is inflated. Tethers or other retention devices are attached between the canister and the chute member to retain the chute member in a predetermined position with respect to the canister so as to direct deployment of the inflatable restraint in a predetermined direction from the occupant seat.

16 Claims, 5 Drawing Sheets

VEHICLE INFLATABLE RESTRAINT SYSTEM

FIELD OF THE INVENTION

The present invention relates to inflatable occupant restraints for automotive vehicles in general, and more specifically to an inflatable restraint with an adjustable deployment chute.

BACKGROUND OF THE INVENTION

A particular type of inflatable restraint for an occupant in a motor vehicle is commonly referred to as an airbag. The airbag is stored in a motor vehicle in an uninflated condition. When the vehicle experiences a collision/indicating condition of a predetermined threshold level, gas is directed to flow into the airbag from a gas producing source. The gas inflates the airbag to an extended condition in which the airbag expands into the occupant compartment of the motor vehicle. When the airbag is inflated, it restrains occupant movement toward interior portions of the motor vehicle.

The airbag is typically mounted in the vehicle as part of an airbag module. In addition to the airbag, the airbag module includes an inflator and a canister. The inflator is the source of gas for inflating the airbag. The canister contains the airbag and the inflator, and typically has a deployment opening through which the air bag emerges from the canister when inflated.

A deployment door normally extends over the deployment opening in the canister to conceal the airbag and other parts of the air bag module from the occupant compartment. The deployment door may be a trim piece on an instrument panel of the motor vehicle.

When the inflator is actuated, gas is directed into the air bag moving it outward from the canister through the deployment opening and forcefully against the deployment door. A closure portion of the deployment door is ruptured by the pressure in the expanding air bag. As the air bag continues to move outward against the deployment door, it pivotally moves the deployment door away from the deployment opening. The deployment door thus opened allows the air bag to enter the occupant compartment through the deployment opening.

To accommodate inflatable restraints into a vehicle seat for side protection of vehicle occupants, a seamless side inflatable restraint deployment system for an occupant seated in a seat is described in U.S. Pat. No. 5,762,363 (Brown et al) assigned to the assignee of the present invention and incorporated herein by reference. That system included a side inflatable restraint module attached to a frame of a seat and a pad disposed adjacent the module having a deployment opening therein. A tear initiator envelope encloses the module and extends through the deployment opening to concentrate deployment forces of the inflatable restraint to form a desired exit location in a seat trim of the seat for the inflatable restraint to deploy therethrough. Packaging of this system as well as other seat mounted side airbag systems, however, may present a comfort issue to an occupant. Such an issue arises due to space limitations, and some seat designs cannot prevent the occupant from feeling the side air bag packaged in the seat. In addition, it may be desirable to adjust the deployment direction of a side air bag to accommodate various seat designs, seat locations, and vehicle designs.

SUMMARY OF THE INVENTION

Accordingly, the present invention provides an inflatable restraint system adapted for attachment to an occupant seat of an automotive vehicle comprising a canister having an inflatable restraint deployable therefrom, a chute member engaged with the canister for directing deployment of the inflatable restraint, and an adjustable retention system attached between the canister and the chute member to retain the chute member in a predetermined position with respect to the canister so as to direct deployment of the inflatable restraint in a predetermined direction from the occupant seat. The chute member encapsulates the inflatable restraint in the canister and is attached to the canister by a plurality of retention tabs. The tabs can be snapped into place through slots or holes in the canister. The chute member is also attached to the canister by a plurality of tethers. The tethers are initially folded when the module is in a predeployed condition and unfold when deployed to retain the chute in a desired position. Tether length can be longer or shorter on a side of the canister as opposed to the opposite side, or on the top versus the bottom. Such an arrangement provides a directional change to the air bag trajectory with respect to the canister opening as dictated by the module mounting angle. Tethers can be added from the module periphery and be of any width or length to provide directional control and strength, as needed, and to accommodate various package locations and conditions. The module is preferable mounted in a rear portion of the seat and the seat cushion material is pre-slit or molded with the slit to allow release of the air bag therethrough so as to reduce fragmentation. Preferably, the slit aligns with a sew seam of an external fabric covering the seat.

Deployment of the system is initiated by the inflator gas entering the air bag. The air bag pushes the chute member away from the canister, dislodging the retention tabs and displacing the seat cushion material. This forces the seat cover sew seam to begin to separate. When the chute travels the length of the tethers, the chute stops, causing a tear seam at the end of the chute to open allowing the air bag to be deployed in a desired direction. The chute member thus protects the seat cushion materials from abrasion and fragmentation.

An advantage of the present invention is an inflatable restraint system which provides a predictable tear location through an occupant seat.

Another advantage of the present invention is an inflatable restraint system which provides an adjustable and controlled air bag deployment trajectory.

Yet another advantage of the present invention is an inflatable restraint system which minimizes seat material fragmentation.

Still yet another advantage of the present invention is an inflatable restraint system which maintains occupant comfort when mounted in a vehicle seat.

A feature of the present invention is a chute member directed by an inflating air bag through a slit in the seat cushion material.

Another feature of the present invention is a chute member attached to a canister by a adjustable sized tethers for directing the air bag in a desired direction.

Still yet another feature of the present invention is a vehicle seat having an air bag module mounted to a rear portion thereof and deployable through a slit in the seat cushion material by a chute directing it in a predetermined direction upon exit from the seat.

Yet still another feature of the present invention is a chute member having tear seam on an end thereof which splits into air bag directing members upon exit from the seat material

DETAILED DESCRIPTION OF THE PREFERRED EMBODIMENT(S)

Figure 1:
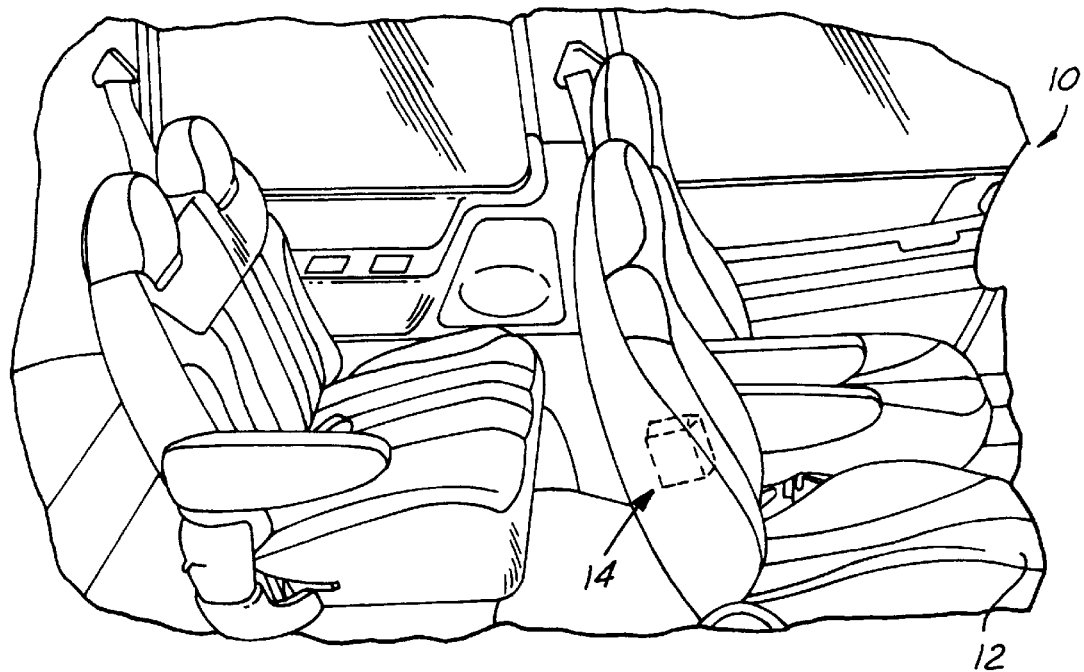
FIG. 1 is a perspective interior view of a vehicle occupant compartment having a seat with an inflatable restraint system according to the present invention.

Referring now to the drawings, and in particular to FIG. 1, an automotive vehicle occupant compartment, shown generally at 10, has an occupant seat 12 mounted therein in known fashion with an inflatable restraint system 14 adapted thereto. As better seen in FIG. 2, the inflatable restraint system according to the present invention is illustrated in operational relationship with the seat 12 which includes a generally horizontal seat portion 16 and a generally vertical back portion 18. Since the present invention may be used with either the seat portion 16 or the back portion 18, only the back portion 18 will be described.

Figure 3:
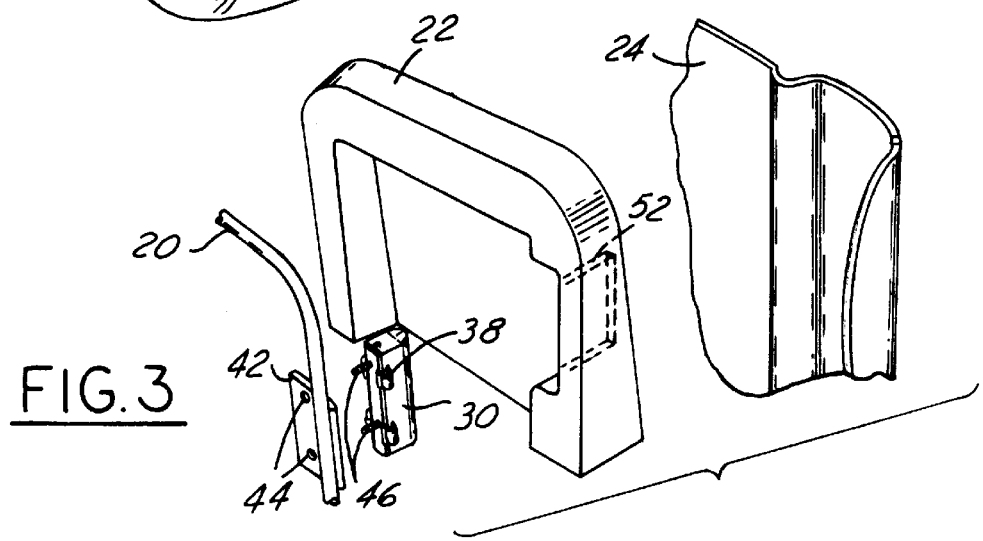
FIG. 3 is an exploded perspective view taken from the rear of the inflatable restraint system and seat of FIG. 2.

The back portion 18 has a seat back frame 20. The seat back frame 20 has a generally inverted U-shape and is made of a hollow member or tube having a generally circular cross section, and is preferably formed of a metal material. The back portion 18 has a seat back pad 22 disposed adjacent the seat back frame 20 and a seat trim 24 covering the seat back pad 22 (FIG. 3). The seat back pad 22 is made of a foam material or cushion. The seat trim 24 is made of a flexible fabric material such as cloth, vinyl, leather, or the like. The seat description so far provided is conventional and known in the art.

Figure 2:
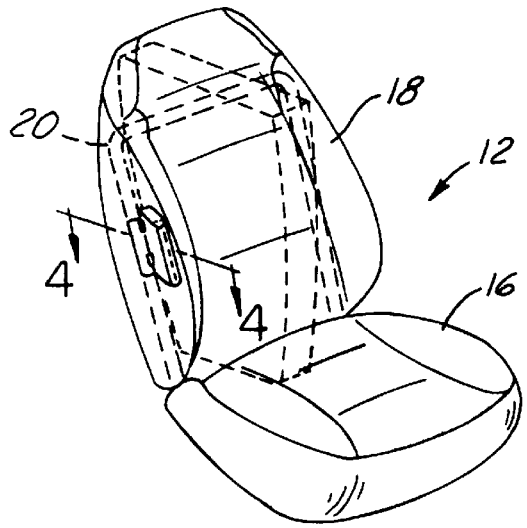
FIG. 2 is a perspective view of a an inflatable restraint system, according to the present invention, illustrated in operational relationship with a seat of a motor vehicle.
Figure 4:
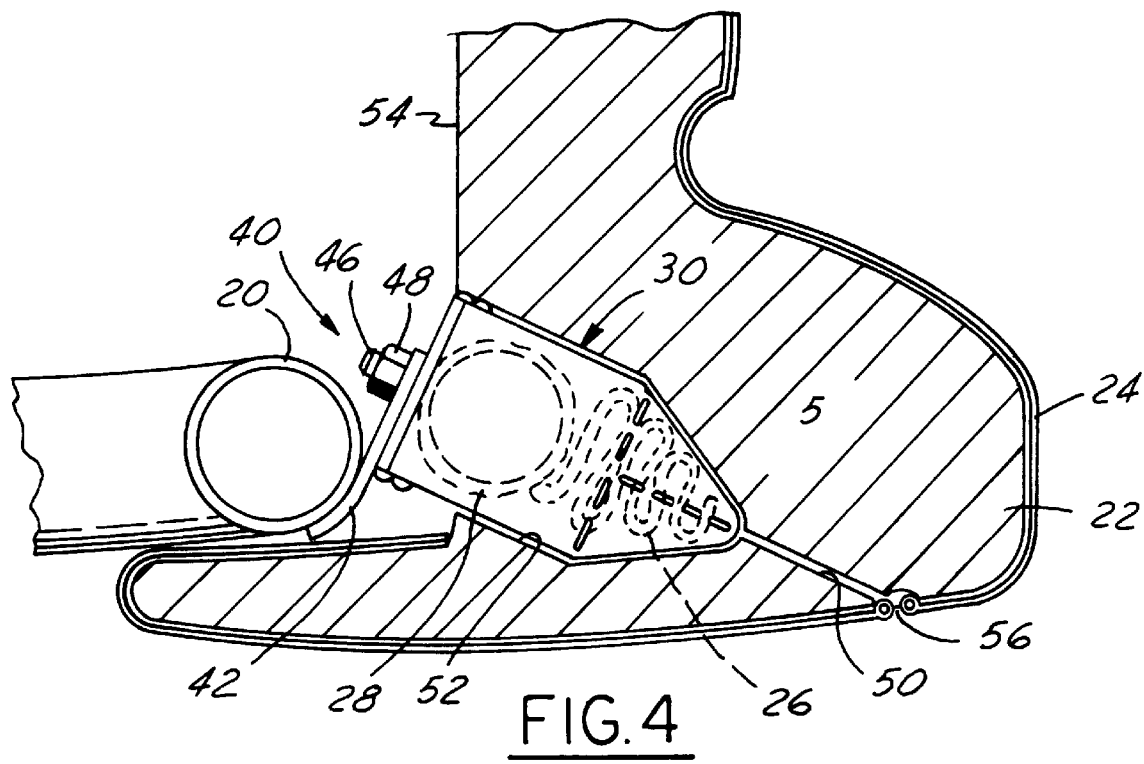
FIG. 4 is a cross sectional view taken along line 4—4 of FIG. 2, showing the inflatable restraint system of the present invention in an undeployed state.
Figure 5:
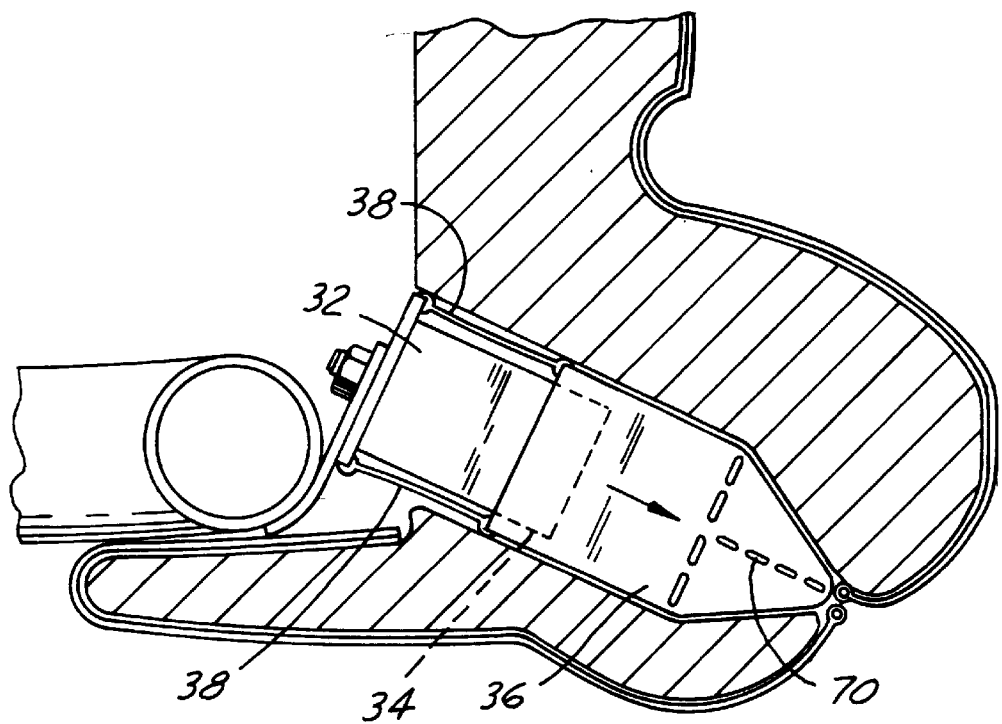
FIG. 5 is a cross sectional view similar to FIG. 4, but shown with a chute member in a deployed state.

Referring to FIGS. 2–4, the inflatable restraint system 14 includes an inflatable restraint 26, such as an air bag (FIG. 4), and an inflator 28 contained within an inflatable restraint module 30. The inflator 28 is the source of inflation fluid or gas for inflating the inflatable restraint 26. The module 30 is comprised of a canister 32 with an open end 34 and a chute member 36 slidably engaged over the canister 32, retained thereto by tethers 38 (FIG. 5).

The inflatable restraint system 14 of the present invention includes a fastening mechanism, generally indicated at 40, for removably fastening the inflatable restraint module 30 to the seat back frame 20. The fastening mechanism 40 includes a plate 42 secured to the seat back frame 20 by suitable means such as welding (FIG. 4). The plate 42 is preferably made of a metal material and has at least one, preferably a pair, of apertures 44 extending therethrough (FIG. 3). The pair of threaded fasteners 46 extend from the module 30 and pass through the apertures 44 and are retained to the plate 42 by a threaded nut 48 (FIGS. 3 and 4).

A path for deployment of the chute member 36 is created as a slit 50 extending generally vertically from a forward portion of the seat back pad 22 to a recess 52 in a back portion of the seat back pad 22 (FIG. 4). The recess 52 receives the inflatable restraint module 30 therein and the seat back pad 22 has an enlarged cavity 54 for receiving the seat back frame 20 (FIGS. 3 and 4). The slit 50 is preferably located adjacent a sew seam 56 in the seat trim fabric 24 to facilitate deployment of the inflatable restraint. Preferably, the seat back pad 22 is made of a foam material which is pre-slit or has the slit 50 molded therein.

Figure 7:
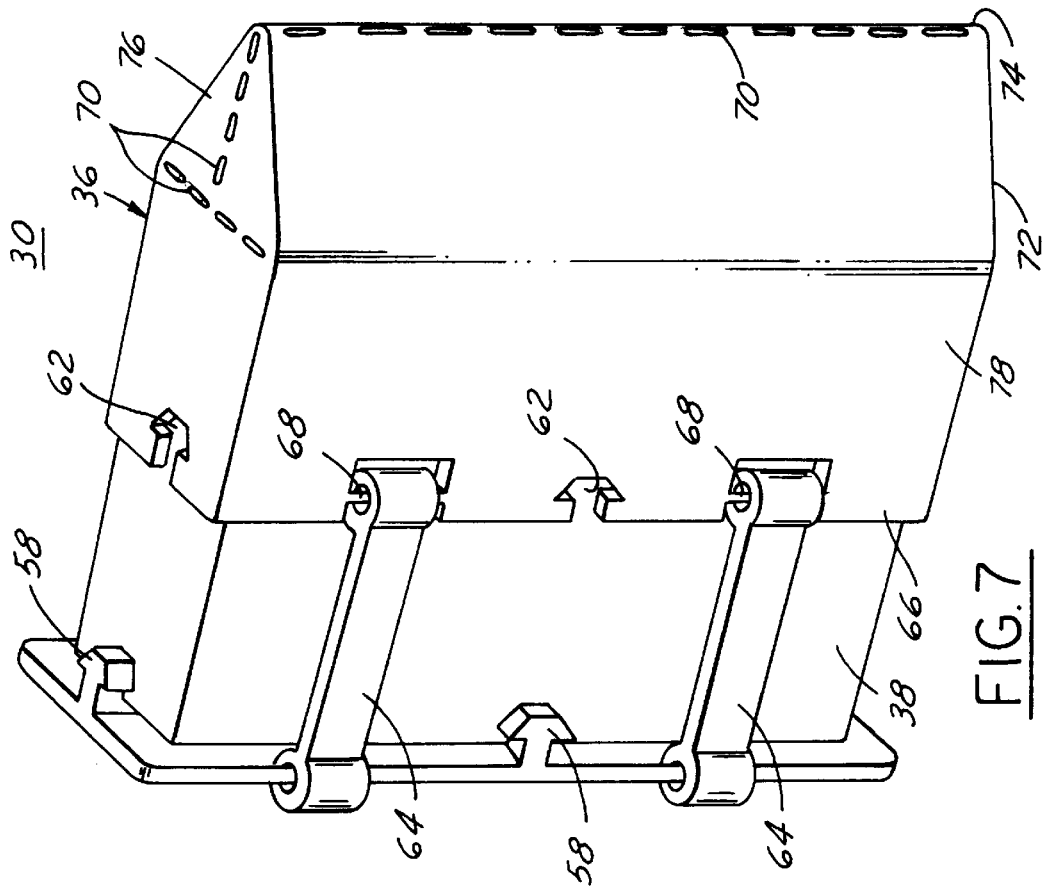
FIG. 7 is a perspective view of an inflatable restraint module shown in a deployed state corresponding to FIG. 5.
Figure 6:
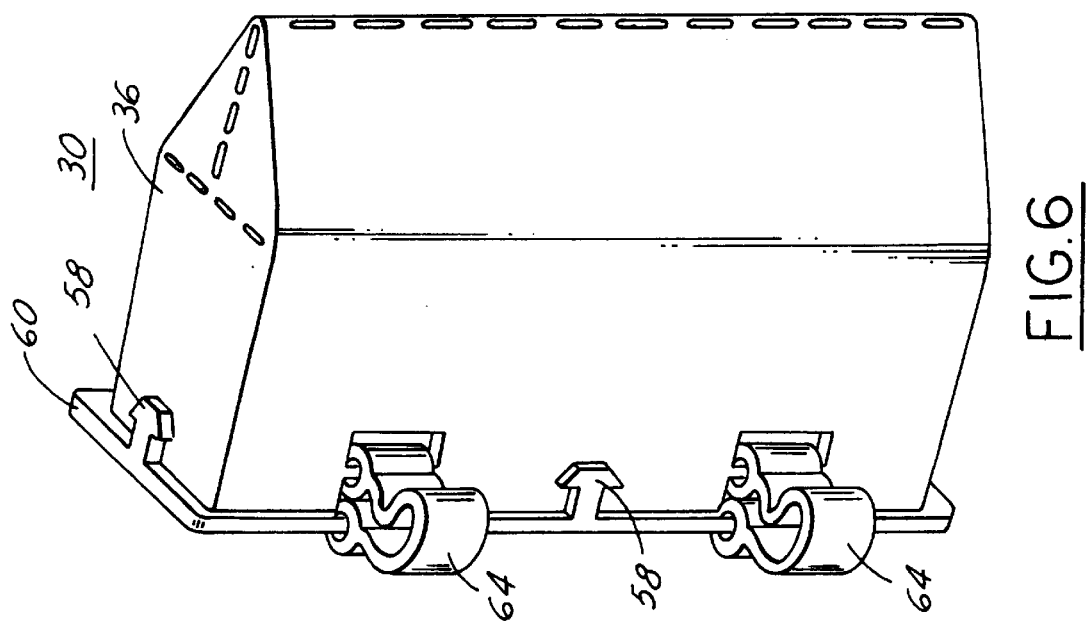
FIG. 6 is a perspective view of an inflatable restraint module, according to the present invention, shown in an undeployed state corresponding to FIG. 4.

Referring now to FIGS. 6 and 7, the inflatable restraint module 30 is shown in a stowed position and a deployed position, respectively. In the stowed position, the chute member 36 is attached to the canister 38 by attachment tabs 58 extending from a base 60 of the module 30. The attachment tabs 58 releaseably engage slots 62 in the chute member 36. The tabs 58 may be integrally molded with the base 60 (FIGS. 6 and 7), or may be snapped into place through holes on the base 60 (not shown). The number of retention tabs can be varied depending on a particular design, and the retention force exerted by the tabs is such that the chute member 36 is held to the base 60 but is low enough not to impede deployment of the chute member 36. Alternatively, the tabs 58 may be integrally molded or otherwise attached to the canister 38 for releasable attaching engagement with the chute member 36.

When in the deployed position, the chute member 36 is retained to a base 60 by tethers 64 (FIGS. 6 and 7). The tethers 64, which can be made of nylon webbing, bag material, or any other flexible, strong material, can be attached along a base end 66 of the chute member 36 to a retention bar 68 (FIG. 7). The other end of the tether is attached to the base 60, or alternatively directly to the canister 38 (not shown). The tethers 64 are initially folded when the chute member 36 is in the predeployed or stowed position (FIG. 6), and unfold to retain the chute member 36 in a predetermined orientation with respect to the canister 36 when in the deployed position (FIG. 7).

The chute member 36, which preferably is made of a molded, thermoplastic material or other suitable material, has a tear seam 70 in an exit end 72 thereof for allowing the inflatable restraint to exit therefrom when the chute member is in the deployed position (FIG. 7). The exit end 72 is preferably narrower than a base end 66 of the chute member 36 so as to facilitate movement through the slit 50 (FIGS. 4–7). As seen in the embodiment of FIGS. 6 and 7, the tear seam 70 extends across a leading edge 74, down a side 76 of the exit end 72, and across the side 76 (FIG. 7). The exit end 72 thus takes the shape of a solid triangle attached atop a solid, rectangular portion 78. Other shapes for the chute member 36 may also be used, including, but not limited to, a cylindrical lower portion and a conical narrower portion with a tear seam therein.

When the chute member 36 is in the fully deployed position, the force of the inflatable restraint 26 tears open the tear seam 70, thus creating a pair of inflatable restraint deflectors 80 which serve to additionally direct the inflatable restraint 26 in a desired direction, and which shield the adjacent back pad fabric from the inflatable restraint 26 so as to minimize fragmentation thereof.

Figure 8:
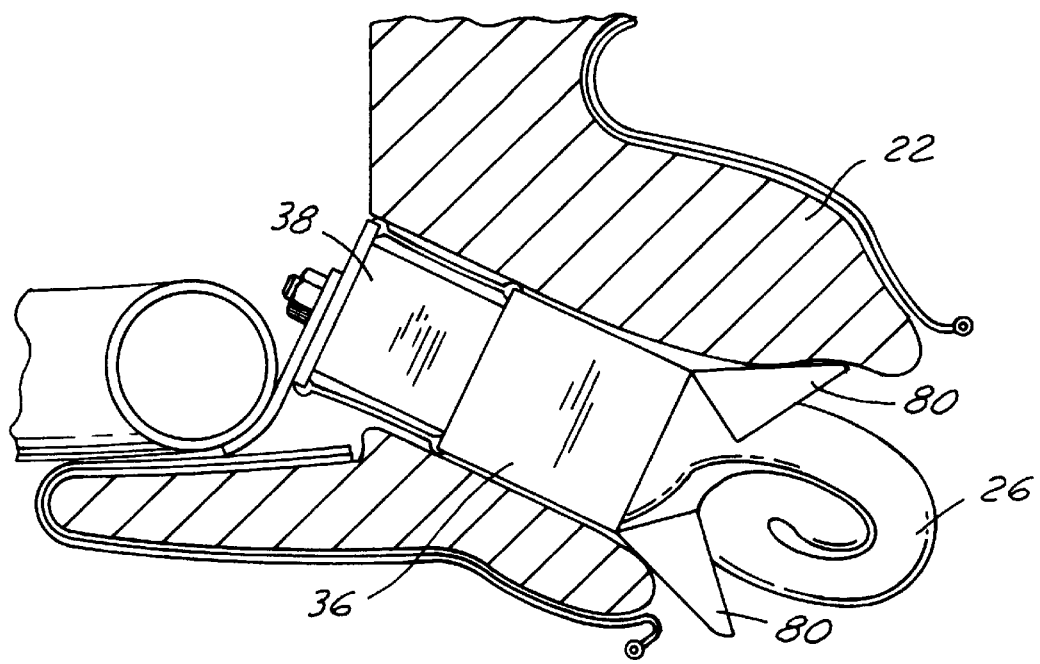
FIG. 8 is a cross sectional view of an inflatable restraint system, according to the present invention, similar to FIG. 5, but showing an inflatable restraint emerging from the chute member.
Figure 9:
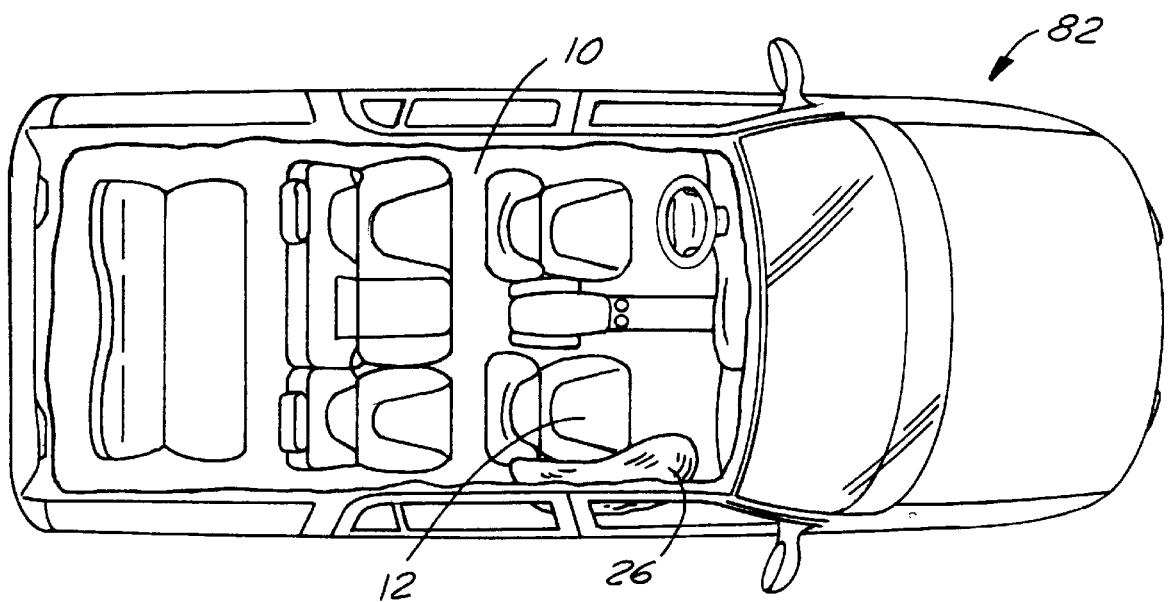
FIG. 9 is a top view of an automotive vehicle having a seat with an inflatable restraint, according to the present invention, shown with the inflatable restraint in a fully deployed state along a side of the vehicle adjacent the seat.

In operation, when the motor vehicle experiences a collision-indicating condition of a predetermined threshold level, the inflator 28 is actuated and gas is directed into the inflatable restraint 26. As the gas enters the inflatable restraint 26, it exerts a force on the chute member 36 and overcomes the retaining force of the attachment tabs 58. As gas further expands the inflatable restraint 26, the chute member 36 slides axially with respect to the canister 38 until the tethers 64 restrain further movement. The chute member 30 thus moves from the stowed position (FIGS. 4 and 6) along the deployment path of slit 50 to the deployed position, parting the seat back foam 22 while moving therethrough (FIGS. 5 and 7). Further expansion of gas into the inflatable restraint causes the seat seam 56 to tear open, thus allowing the inflatable restraint to expand outside of the vehicle seat 12 (FIGS. 8 and 9) so as to provide occupant protection within the passenger compartment 10 of the vehicle 82.

Figure 10:
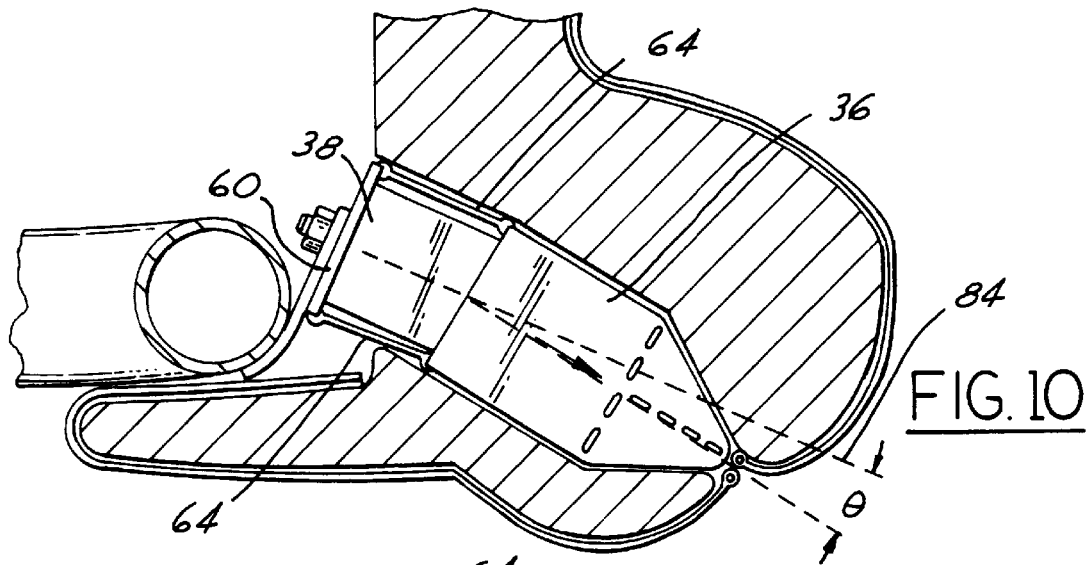
FIGS. 10 and 11 are cross sectional views similar to FIG. 5, but showing the chute member adjustably retained in horizontally angled positions inwardly toward the seat and outwardly of the seat, respectively, with respect to an inflatable canister.
Figure 11:
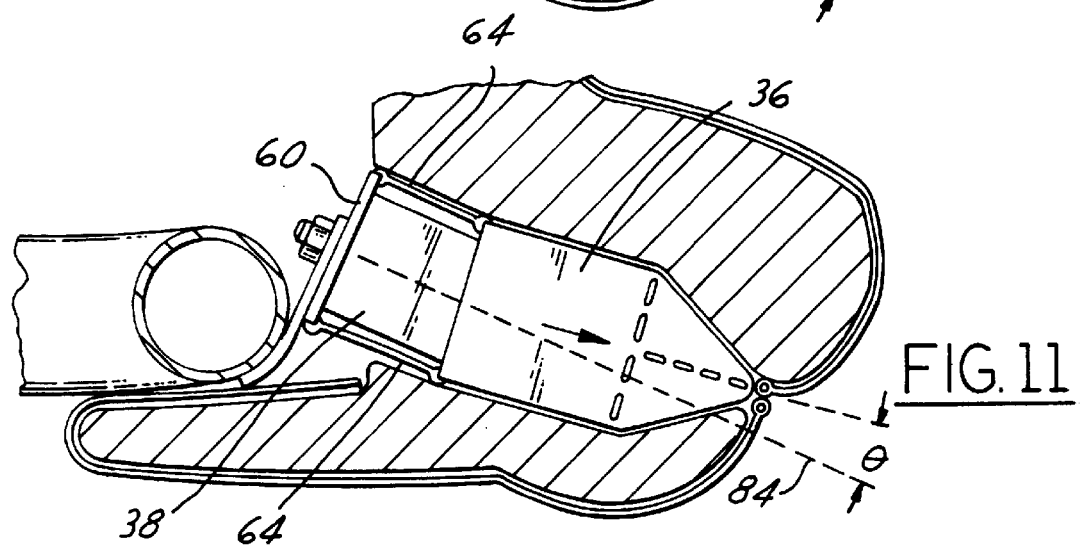
Figures 12, 13:
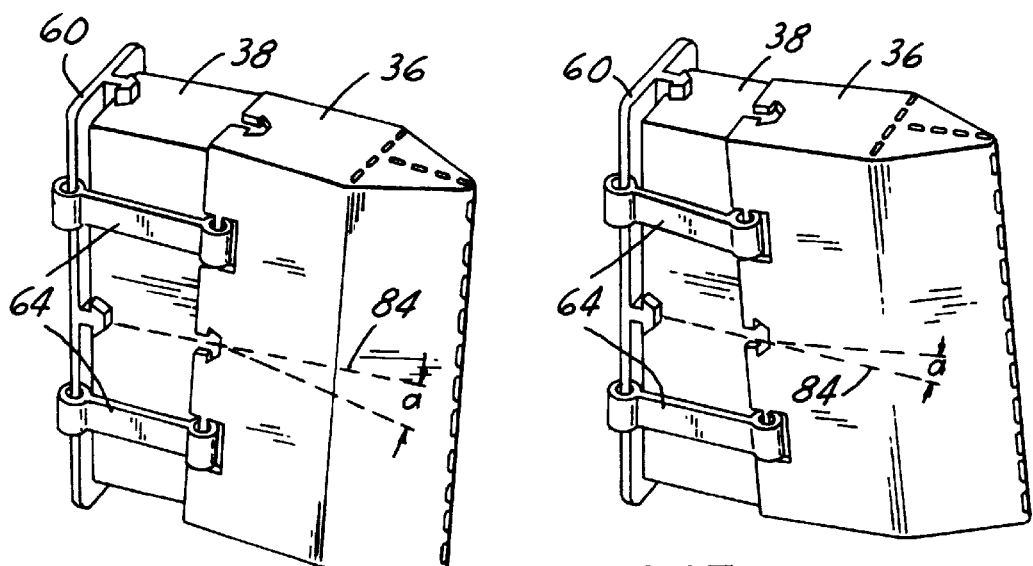
FIGS. 12 and 13 are perspective views of an inflatable restraint module similar to FIG. 7, but showing the chute member adjustably retained in downward and upward angles, respectively, in a vertical plane with respect to the canister.

The tethers 64 can be made longer on one side as opposed to the opposite side, as seen in FIGS. 10 and 11, so as to vary deployment of the inflatable restraint by an angle $\theta$ from an axis 84 through the canister 38 in a generally horizontal plane. Likewise, the tether 64 lengths can be made longer or shorter on a top or bottom so as to vary the angle of deployment of the inflatable restraint 26 by an angle $\alpha$ from the axis 84, which is substantially perpendicular to the base 60, to allow adjustable deployment in a generally vertical plane (FIGS. 12 and 13). A combination of tether lengths may also be used to adjust the deployment angle of the inflatable restraint 26 in both the horizontal and vertical planes. Further, the tethers 64 may be made so as to have an adjustable length to permit adjustment of the deployment of the inflatable restraint 26.

Accordingly the inflatable restraint system 14 of the present invention provides seat comfort to be maintained by positioning the inflatable restraint module at a rear portion of the seat back. The invention also resists fragmentation by having a chute member, which slides through and parts the seat back foam ,in addition to deflectors, which deflect the inflatable restraint 26 away from the seat.

While the present invention has been described with respect to a seat mounted side inflatable restraint, it should be understood that the present invention may be used in other locations in which packaging of an inflatable restraint system requires deployment through a vehicle component and/or adjustable direction of the inflatable restraint with respect to a canister or base member.

The present invention has been described in an illustrative manner. It is to be understood that the terminology used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An inflatable restraint system for an occupant seat of an automotive vehicle, comprising:

a canister having an inflatable restraint deployable therefrom and adapted for attachment to the occupant seat;

a chute member deployable from the canister for directing deployment of the inflatable restraint, wherein the chute member slidably engages the canister for movement between a stowed position when the inflatable restraint is uninflated and in a deployed position when the inflatable restraint is inflated, and wherein the chute member has an exit end with a tear seam therein for allowing the inflatable restraint to exit therefrom when the chute member is in the deployed position; and retention means for retaining the chute member in a predetermined position with respect to the canister so as to direct deployment of the inflatable restraint in a predetermined direction from the occupant seat.

2. The inflatable restraint system according to claim 1 wherein the exit end of the chute member is narrowed with respect to a base end of the chute member.

3. The inflatable restraint system according to claim 1 wherein the retention means comprises at least one tether attached between the canister and the chute member.

4. The inflatable restraint system according to claim 1 wherein the retention means comprises at least one tether of a first predetermined length mounted between a first canister side and a first chute side, and at least one tether of a second predetermined length mounted between a second canister side and a second chute side.

5. The inflatable restraint system according to claim 1 including attachment means for releasably attaching the chute member to the canister.

6. An inflatable restraint system adapted for attachment to an occupant seat of an automotive vehicle, comprising:

a canister having an inflatable restraint deployable therefrom;

a chute member engaged with the canister for directing deployment of the inflatable restraint;

a retention system attached between the canister and the chute member to retain the chute member in a predetermined position with respect to the canister so as to direct deployment of the inflatable restraint in a predetermined direction from the occupant seat; and at least one attachment tab on one of the canister and the chute member for releasable attachment with the other of the canister and the chute member.

7. The inflatable restraint system according to claim 6 wherein the chute member slidably engages the canister for movement between a stowed position when the inflatable restraint is uninflated and a deployed position when the inflatable restraint is inflated.

8. The inflatable restraint system according to claim 7 wherein the chute member has an exit end with a tear seam therein for allowing the inflatable restraint to exit therefrom when the chute member is in the deployed position.

9. The inflatable restraint system according to claim 8 wherein the chute member has a narrowed exit end with respect to a base end of the chute member adapted for movement through a deployment path in the occupant seat.

10. The inflatable restraint system according to claim 6 wherein the retention system comprises at least one tether of a first predetermined length mounted between a first canister side and a first chute side, and at least one tether of a second predetermined length mounted between a second canister side and a second chute side.

11. The inflatable restraint system according to claim 6 wherein the chute member has at least one inflatable restraint deflector in the exit end thereof.

12. A vehicle seat with a side airbag system for an automotive vehicle, comprising:

a seat frame adapted for mounting to the automotive vehicle;

a seat cushion attached to the seat frame and having a pocket therein adjacent the frame;

an inflatable restraint module positioned in the pocket and secured to the frame, the module having;

a canister containing an inflatable restraint deployable through an open end thereof;

a chute member slidably engaged over the open end of the canister and movable between a stowed position when the inflatable restraint is uninflated and a deployed position when the airbag is inflated, the chute member having an exit end and with a tear seam therein for allowing the inflatable restraint to exit therefrom when in the deployed position;

retention means for retaining the chute member in a predetermined position with respect to the canister when in the deployed position so as to direct the inflatable restraint in a predetermined direction from the seat; and at least one attachment tab on one of the canister and the chute member for releasable attaching engagement with the other of the canister and the chute member.

13. The inflatable restraint system according to claim 12 wherein the exit end is a solid triangular shaped portion with a tear seam extending along a leading edge and onto opposing sides of the exit end for allowing the inflatable restraint to exit therefrom when the chute member is in the deployed position.

14. The inflatable restraint system according to claim 13 wherein the leading edge of the chute member moves through a deployment path in the occupant seat between the pocket and an outer surface of the occupant seat.

15. The inflatable restraint system according to claim 14 wherein the inflatable restraint separates the tear seam of the exit end of the chute member when in the deployed position to create at least one inflatable restraint deflector in the exit end to direct deployment of the inflatable restraint outside of the occupant seat.

16. The inflatable restraint system according to claim 12 wherein the retention means comprises at least one tether of a first predetermined length mounted between the canister the chute member, and at least one tether of a second predetermined length mounted between the canister and the chute member.

* * * * *